United States Patent [19]

Schmitt, Jr. et al.

[11] 4,035,260

[45] July 12, 1977

[54] PROCESS FOR HYDROGENATION CATALYSTS OF IMPROVED DISTRIBUTION OF ACTIVE COMPONENTS

[75] Inventors: Joseph Lawrence Schmitt, Jr., Bethel; Jacob Solomon Brinen, Stamford, both of Conn.

[73] Assignee: American Cyanamid Company, Stamford, Conn.

[21] Appl. No.: 653,554

[22] Filed: Jan. 29, 1976

[51] Int. Cl.² .......................................... B01J 21/18
[52] U.S. Cl. ................................................ 252/447
[58] Field of Search ..................................... 252/447

[56] References Cited

U.S. PATENT DOCUMENTS

| | | | |
|---|---|---|---|
| 3,138,560 | 6/1964 | Summit et al. | 252/447 |
| 3,663,166 | 5/1971 | Weise et al. | 252/447 |
| 3,736,265 | 5/1973 | Suggitt | 252/447 |
| 3,736,266 | 5/1973 | Schrage | 252/447 |
| 3,793,224 | 2/1974 | Cooper et al. | 252/447 |
| 3,804,779 | 4/1974 | Kent et al. | 252/447 |
| 3,864,281 | 2/1975 | Ohorodnik et al. | 252/447 |
| 3,974,227 | 8/1976 | Berthoux et al. | 252/447 X |
| 3,979,329 | 9/1976 | Cooper | 252/447 X |

*Primary Examiner*—Patrick P. Garvin
*Assistant Examiner*—William G. Wright
*Attorney, Agent, or Firm*—William J. van Loo

[57] ABSTRACT

Reductive deposition of a platinum metal on a preformed porous carbon support provides increased intensity ratios of support/platinum metal as the average pore radius of the carbon support increases.

6 Claims, No Drawings

PROCESS FOR HYDROGENATION CATALYSTS OF IMPROVED DISTRIBUTION OF ACTIVE COMPONENTS

This invention relates to a process for increasing the dispersion of active component of a hydrogenation catalyst. More particularly, it relates to such a process wherein a wide pore carbon support has a platinum metal active component reductively deposited thereon.

A convenient and effective form of heterogeneous catalyst is one in which a pre-formed support of suitable porous substrate material carries on the surface area generated by its pores in active component which assists in obtaining or effects the desired catalytic reaction. The activity and selectivity of the catalyst are affected by the pore structure and character of the catalytic surface of the heterogeneous catalyst as well as by other factors.

In considering a chemical reaction involving the fluid state in conjunction with a heterogeneous catalyst, the following discussion is pertinent. In order that a reactant in the main fluid phase may be converted catalytically to a product in the main fluid phase, it is necessary that the reactant be transferred from its position in the fluid to the catalyst interface, be activatedly adsorbed on the catalyst surface, and undergo reaction to form an adsorbed product. The product must then be desorbed and transferred from the interface to a position in the final phase. The rate at which each of these steps occurs influences the distribution of concentrations in the system and plays a part in determining the overall rate. These steps may be enumerated as follows for porous catalysts:

1. The mass transfer of reactants and products to and from the gross exterior surface of the catalyst particle and the main body of the fluid.
2. The diffusional and flow transfer of reactants and products in and out of the pore structure of the catalyst particle when reaction takes place at interior surfaces.
3. The activated adsorption of reactants and activated desorption of products at the catalyst interface.
4. The surface reaction of adsorbed reactants to form activation-adsorbed products.

Step 1 is determined by the flow characteristics of the system, such as the mass velocity of the fluid stream, the size of the particles, and the diffusional characteristics of the fluid stream.

Step 2 is determined by the degree of porosity of the catalyst, the dimensions of the pores, the extent to which they are interconnected, the size of the particles, the diffusional characteristics of the system, and the rate at which the reaction occurs at the interface.

Step 3 is determined by the character and extent of the catalytic surface and by the specific activation energies required for adsorption and desorption of each of the components of the fluid.

Step 4 is determined by the nature and extent of the catalytic surface and by the activation energies required for the reaction on the surface.

Thus, it can be seen that both pore size and the character of the catalytic surface are important factors which must be considered for optimum catalyst performance.

It is well recognized that not all of the surface area provided by the pores of the pre-formed support is catalytically active. For this reason, it is generally necessary to provide as much available surface area as is possible so that a goodly portion thereof might become catalytically active. However, in order to provide the necessary diffusion of reactants in and out of the pore structure, it is necessary to provide pores of suitable size. As it happens, the available surface area of a support decreases as the pore size increases. Therefore, when large reactant molecules are employed, some sacrifice in surface area must occur in providing adequate pore size. Nevertheless, it remains conventional procedure to provide as much available surface area as is possible while providing the minimum necessary pore size.

The fact that all of the surface area of a heterogeneous catalyst is not catalytically active may be attributed to numerous factors. One factor, as previously indicated, is the character of the catalyst surface and this is influenced by the nature of the distribution of active component thereon. When the various materials that form the active component are deposited upon the surface area and converted to the active component, little information has previously been available to indicate how the active component is distributed over the surface area. The ideal distribution would be such that a monomolecular layer of the active component is distributed over the entire available surface area. However, the actual distribution achieved, although not known, must be far from the ideal distribution in view of the fact that not all of the surface area of the catalyst is catalytically active. The actual catalysts provided, therefore, must have some extent of surface area that is free of active component and some extent of surface area that contains multimolecular layers of active component. Since it is generally held that only the outer molecular layer of active component catalyzes, the multimolecular layers actually represent a waste of active component and the areas free of active component represent catalytically inactive areas.

Various studies have been made to find new techniques for deposition of active component upon the surface area of catalyst supports so as to provide more active catalysts. In such studies, the same catalyst support and the same amount of active component were involved but the technique by which the active component was deposited was varied. The results of these studies indicated that the activity of the final catalyst varied to some extent depending upon the technique of deposition of active component employed. These results were interpreted as indicating that better distribution of active component must have occurred in order to account for the better performance when obtained, in spite of the fact that no confirmatory analytical data was available to support the interpretation. Some methods of determining the distribution of active component (when it is a metal) have been described, such as the selective chemisorption of gases, but these methods are not applicable to all catalyst systems. In addition, some of these methods require experimental conditions which may result in alteration of the catalyst under study, as when the increased temperature required for cleaning the catalytic surface results in sintering of the supported metal and a change in metal dispersion. Thus, up to the present time, there were no analytic procedures used to confirm distribution of active component on the surface area of the support and any interpretation of such distribution based on catalyst performance is mere conjecture.

The vast majority of studies involving distribution of active components on supports employed hydrous oxide supports, particularly those supports based on alumina since it is the most widely used support material. The findings made with respect to distribution of active components on alumina were considered generally applicable to supports of other materials.

Alumina, and mixtures thereof with other hydrous oxides, can be prepared conveniently as supports having a wide range of pore radii and surface area provided by the pores, the surface area decreasing as the pore radius increases. Specific procedures of preparation of the alumina supports enable controlled pore radii to be obtained as desired. This is the reason for selecting alumina as a basis for studies of distribution of active component as influenced by pore size or surface area.

Electron spectroscopy for chemical analyses, ESCA, is a recently developed analytical procedure that has numerous applications. In conjunction with the present invention, use was made of ESCA to indicate the distribution of active component on catalyst supports. ESCA was used to measure the intensity ratio of support/metal of a number of catalysts, the metal being the active component. The intensity ratio is indicative of the distribution of the active component over the surface area of the catalyst support, and, since only the outermost layers of each catalyst grain are scanned by ESCA, higher values indicate more favorable distribution. One finding of ESCA is that as the loading of active component is increased, the intensity ratio decreases, indicating that at high usages of active component, the distribution of active component is multi-layered instead of the desired monomolecular layer. Another finding is that as the average pore radius of an alumina support increases, i.e., surface area decreases, the intensity ratio decreades indicating a less favorable distribution of active component. Thus, as the surface area of an alumina support is decreased by increasing the average pore radius, the active component becomes distributed in increased multi-layered pattern because of the decrease in available surface area.

Accordingly, although the prior art does provide active catalysts for many catalytic reactions, there, nevertheless, continues to exist the need for improved catalyst materials and, in particular, for catalyst materials wherein the efficiency of the catalyst is greatly increased with respect to the amount of active component present. Stated alternatively, there is a need for a process for preparing a catalyst wherein the intensity ratio of support/active component as determined by ESCA is increased for a given level of usage of active component. Such a development would provide greater conversion for a given level of usage of active component as well as desirable level of conversion with reduced usage of active component. These results would reduce the requirements for valuable active components for a given production of desired product and thus constitute a significant advance in the art.

In accordance with the present invention there is provided a process for increasing the support/metal intensity ratio as measured by electron spectroscopy for chemical analysis of a hydrogenation catalyst which comprises reductively depositing upon a pre-formed porous carbon support an effective amount of a platinum metal, said support having an average pore radius of at least about 25 angstrom units, a surface area provided by said pores in the range of about 300 to 700 square meters per gram and a compacted bulk density in the range of about 0.3 to 0.8 gram per cubic centimeter.

In accordance with the present invention, reductive deposition of a platinum metal on a pre-formed porous carbon support provides increased intensity ratios of support/platinum metal as the average pore radius of the crbon support increases. This result is highly surprising and completely unexpected in view of the directly opposite results obtained when alumina supports were similarly treated. It is also surprising that the result should depend on the method of deposition of active component.

Catalysts produced by the process of the present invention because of their improved distribution of active component provide improved effectiveness over other similar catalysts not having the improved distribution. Catalysts according to the process of the present invention at a given usage of platinum metal provide increased activity and selectivity over comparable prior art catalysts of smaller pore radii. The present process also provides catalysts of desirable activity and selectivity at lower usage of platinum metal than comparable catalysts of smaller pore radii. These results are achieved in spite of the lower surface area of the supports used in the present process.

The present invention requires use of a carbon support of specified pore size, surface area, and compacted bulk density. The average pore radius is based upon the relationship between surface area and pore volume, assuming cylindrical pores (a valid assumption in the absence of definite pore-shape data). The average pore radius, $m$, is defined as twice the pore volume, 2PV, divided by the BET surface area, $SA_{BET}$, and multiplied by $10^4$. This is expressed in the equation $m = 2PV/SA_{BET} \times 10^4$, wherein pore volume is in cubic centimeters per gram, surface area is determined by nitrogen sorption and is in square meters per gram and the average pore radius is expressed in angstrom units. The primary consideration is selecting a useful carbon support for purposes of the present invention, therefore, is the average pore radius, which must be at least 25 angstrom units. Since the average pore radius is determined from the relationship, it is necessary to know these values. Pore volume will generally range from about 0.375 to 1.4 cc./gm. and surface area will generally range from 300 to 700 m²/gm. Another consideration in selecting a useful carbon support for purposes of the present invention is its compacted bulk density which must be about 0.3–0.8 gram per cubic centimeter. The methods of determining the necessary values are given next.

PORE VOLUME

For purposes of this invention, it is convenient to measure pore volume utilizing water absorption, which gives results which are reproducible to about ±10% and is readily performed. The method is as follows:

1. Into an evaporating dish, weigh out a suitable amount, generally 1–2 grams of the carbon support.
2. Add water slowly while mixing with a spatula. When water is no longer absorbed by the solid, carefully blot and remove excess water from the dish.
3. Reweigh the material.
4. Calculate the pore volume, assuming that the absorbed water occupies the pore volume and 1 gram of water occupies one cubic centimeter.

SURFACE AREA

The surface area is determined by a low temperature nitrogen adsorption technique which was first reported by Brunauer, Emmet, and Teller, J. Amer. Chem. Soc. 60, 309 (1938) and is thus referred to as the BET surface area. Modifications of the procedure are reported in Anal. Chem. 30, 1387 (1958) and 34, 1150 (1962).

COMPACTED BULK DENSITY

Compacted bulk density is determined by carefully pouring the sample into a weighed graduated cylinder while vibrating the cylinder to compact the solid. The cylinder is reweighed, the volume of the cylinder read, and the CBD expressed as the weight in grams of a cubic centimeter of compacted solid.

In selecting a carbon support for purposes of the present invention, it is generally suitable to select one that has an average pore radius as calculated from pore volume and surface area values of at least about 25 angstrom units and a compacted bulk density in the range of about 0.3 to 0.8 gram per cubic centimeter. The necessary value of average pore radius can be found among carbon supports that have the proper combinations of pore volume in the range of about 0.375–1.3 cc./gm. and surface area in the range of about 300 to 700 m$^2$/gm. For example, a support having a pore volume of 0.375 cc./gm. and a surface area of 300 m$^2$/g. will have an average pore radius of 25 angstrom units and a support having a pore volume of 1.4 cc./g. and a surface area of 700 m$^2$/g. will have an average pore radius of 40 angstrom units.

The average pore radius is that associated with the carbon support. Some reduction in values of surface area and pore volume is generally associated with deposition of the platinum metal, but the actual pore radius of the final catalyst composition generally remains essentially constant.

In selecting carbon supports for purposes of the present invention, it is to be noted that only some of the commercially available carbon particulates meet the requirements as to average pore size and compacted bulk density. It is also to be noted that the limitation as to an average pore radius of at least 25 angstrom units does not preclude some pores of smaller radii. The limitation merely designates that the summation of all pores with respect to both number and size will result in an average pore radius of at least 25 angstrom units. Thus, the limitation excludes carbons which contain a major portion of small pores and an insufficient number of large pores to provide the necessary average pore radius. It also excludes carbons which have porosity such that the compacted bulk density is outside the specified limits of 0.3–0.8 gram per cubic centimeter.

The limitation as to the compacted bulk density of the selected carbon support, as has been indicated, is that it be in the range of about 0.3–0.8 g./cc. At values above about 0.8 g./cc., it is generally not possible to obtain the necessary combination of pore volume and surface area to provide an average pore radius of at least 25 angstrom units. At values below about 0.3 g./cc., the amount of the resulting catalyst that can be packed in a unit reactor volume on a weight basis will generally be too low to provide efficient reaction rates.

Porous carbons are generally obtained by activation of a suitable material such as coal or wood charcoal with oxidizing agents. These oxidizing agents, e.g., $O_2$, CO, steam, and the like, react away protions of the carbon leaving behind pores. Some of the carbon particulates made in this manner have the necessary physical properties required to serve as supports in the present invention although many are unsuitable. Recently, a new technique was developed for preparing carbon supports of controlled porosity and this technique is particularly suitable for preparing supports for use in the present invention. In the new technique carbon black spheres are adhered together with a carbonizable adhesive in shaped form and after carbonization of the adhesive, carbon particles of large pore radii are obtained.

The term "pre-formed," as it applies to supports of the present invention, means that the support is prepared separate from any active component that is used in the final catalyst. Thus, the support will be prepared as described without any provision for active component thereon unit after support preparation is complete. This is the usual procedure in conjunction with conventional carbon supports but newer procedures in preparing carbon supports and conventional procedures for preparing supports of other materials allow for incorporation of active components during support preparation. Since the present invention requires the platinum metal active component to be reductively deposited on a carbon support of specified properties, it is necessary that the support be pre-formed.

Once a suitable carbon support has been selected as specified above, it is next treated to provide the content of active component thereon. In the present invention the active component is one or more of the platinum metals. Such metals include ruthenium, rhodium, palladium, osmium, iridium, and platinum. Effective amounts may range from about a thousandth to about 15 percent or more, depending upon the hydrogenation reaction involved and the metal employed. In conducting such reactions, the content of active component will conform to conventional teachings with improved activity being obtained by use of the preparative process of the present invention.

In providing the content of active component on the carbon support, a soluble salt of the platinum metal is dissolved in water at the level necessary to provide the desired content on the support. The solution should be of sufficient volume to provide a ratio of liquor volume to support weight of about 5/1 to 20/1 cc./gm. It is preferred to dissolve the salt in the minimum amount of water necessary and to dilute the resulting solution with an inert water soluble solvent such as dimethylformamide since this appears to give best results.

After the solution is obtained as indicated, the carbon support is immersed therein in a suitable container. The container and contents are then placed on a shaking apparatus and subjected to hydrogenation under pressure. After hydrogen uptake is complete, the catalyst is separated from the liquor, washed with water, and then maintained in approximately 50% water-wet state until used. The hydrogenation deposits the active metal on the surface area of the catalysts. Suitable variations in the deposition technique may be carried out so long as they do not interfere with the properties of the resulting catalyst.

In carrying out hydrogenation reactions using catalysts prepared by the present process, a hydrogenatable organic compound -(N,N'-dicarbobenzyloxyhydrazino) hydrogenated by contacting said compound with hydrogen in the presence of the catalyst prepared by the process of the invention under hydrogenating conditions. Preferred reactions are in the reduction of 6-hydroxy hydronaphthacenes, as described in U.S. Pat. No. 3,019,260 issued Jan. 30, 1962 to McCormick et al. and related compounds. Another preferred reaction is the reduction of 2,4-dinitrotoluene and related compounds to the corresponding diamines. Additional reactions which can be advantageously carried out using catalyst materials obtained by the process of the present invention are those involving reductive alkylation of 7-(N,N'-dicarbobenzyloryhydranino) tetracyclines and 7-(N,N'-dicarbobenzoxylhydrazino)-11a-halotetracyclines.

The invention is more fully illustrated in the examples which follow wherein all parts and percentages are by weight unless otherwise specified.

COMPARATIVE EXAMPLES A AND B

Two conventional alumina supports in particulate form were obtained which had different average pore radii as calculated from the values of surface area and pore volume associated therewith.

In separate runs, each support was treated as follows to provide a hydrogenation catalyst. In 20 ml. of water was dissolved 3.74 grams of $RhCl_3.3H_2O$ and the resulting solution was added to 180 ml. of dimethyformamide in a 500 ml. bottle. To the mixture was added 10.5 grams of the support particulates and the mixture was hydrogenated at 50 psig. using a Parr shaker to deposit rhodium metal on the alumina particulates. When $H_2$ uptake was complete, the catalyst was filtered, washed with water and stored in approximately 50% water-wet state. The catalysts obtained contained 12% rhodium metal based on the total catalyst composition.

COMPARATIVE EXAMPLES C AND D

The procedure of Comparative Examples A and B was repeated in every material detail except that the usage of $RhCl_3.3H_2O$ was reduced to one half so as to provide 6% rhodium metal based on the total catalyst composition.

The catalysts obtained in Comparative Examples A D, inclusive, were analyzed by ESCA to determine the intensity ratio of alumina/rhodium. Results are given in Table I.

a carbon support commercially obtained and having physical properties as indicated in Table II.

EXAMPLE 1

Preparation of Carbon Support

A furfuryl alcohol polymer was prepared by mixing 200 milliliters of furfuryl alcohol, 200 milliliters of water, and 1 milliliter of concentrated $H_2SO_4$. The mixture was heated at 90° C. for 10 minutes. The dark polymer was washed twice with water and then stored in a closed bottle.

In 100 ml. of acetone was dissolved 10 grams of the furfuryl alcohol polymer prepared above. The resulting solution was added to 40 grams of carbon black spheres having an average particle diameter of 120 angstrom units and a surface area of 850 square meters per gram. The resulting composition was thoroughly mixed using a Sunbeam Mixmaster. The mixture was extruded through a hole of 1/16 inch diameter using a piston-type extruder operating at 800–2000 pounds per square inch gauge.

The resulting extrudates were heated overnight at 110° C. to volatilize all of the acetone present and then carbonized in a tube furnace under flowing $N_2$. A temperature of 600° C. was reached in about 1 hour and held for 1 hour. The extrudates were then cooled to room temperature under flowing nitrogen. The support was obtained in the form of cylindrical pellets having the physical properties given in Table II.

Preparation of Catalyst

In separate runs, portions of the support prepared above were treated as follows to provide a hydrogenation catatlyst. In one run, in 20 ml. of water was dissolved 3.74 grams of $RhCl_3.3H_2O$ and the resulting solution was added to 180 ml. of dimethylformamide in a 500 ml. bottle. In a second run, the same procedure was followed except that the amount of $RhCl_3.3H_2O$ was reduced to 1.87 grams. To the separate mixtures was added 10.5 grams of the catalyst support prepared above and the separate mixtures were hydrogenated at

TABLE I

| Comparative Example | Rhodium Content(%) | Alumina/Rhodium Intensity Ratio | | | $Al_2O_3$/Rh Intensity Ratio (ESCA) |
|---|---|---|---|---|---|
| | | Support Physical Properties | | | |
| | | Surface Area[1] | Pore Volume[2] | Pore Radius[3] | |
| A | 12 | 100 | 0.65 | 130 | 0.36 |
| B | 12 | 300 | 0.75 | 50 | 0.83 |
| C | 6 | 100 | 0.65 | 130 | 1.0 |
| D | 6 | 300 | 0.75 | 50 | 3.7 |

[1]$m^2/g$
[2]$cm^3/g$
[3]Å

These results show that as the pore radius of an alumina support increases, i.e., the surface area decreases, the intensity ratio decreases. This indicates that the rhodium distribution on the surface area is better when larger surface area is available.

COMPARATIVE EXAMPLES E AND F

The procedure of Comparative Examples A – D was again followed to deposit 12 and 6% rhodium metal on 50 psig using a Parr shaker to deposit metal on the carbon particulates. When $H_2$ uptake was complete, the catalyst was filtered, washed with water and stored in approximately 50% water-wet state.

The catalysts obtained in Comparative Examples E and F and Example 1 were analyzed by ESCA to determine the intensity ratio of carbon/rhodium. Results are given in Table II.

TABLE II

| Catalyst of Example | Rhodium Content(%) | Carbon/Rhodium Intensity Ratio | | | C/Rh Intensity Ratio ESCA |
|---|---|---|---|---|---|
| | | Support Physical Properties | | | |
| | | Surface Area[1] | Pore Volume[2] | Pore Radius[3] | |
| E | 12 | 850 | 0.70 | 16 | 0.78 |
| F | 6 | 850 | 0.70 | 16 | 1.8 |
| 1 | 12 | 560 | 0.95 | 34 | 2.9 |

TABLE II-continued

| Catalyst of Example | Rhodium Content(%) | Carbon/Rhodium Intensity Ratio Support Physical Properties | | | C/Rh Intensity Ratio ESCA |
|---|---|---|---|---|---|
| | | Surface Area[1] | Pore Volume[2] | Pore Radius[3] | |
| 1 | 6 | 560 | 0.95 | 34 | 4.8 |

[1] as in Table 1
[2] "
[3] "

The results show that as the pore radius of carbon supports increases, the intensity ratio increases, a result quite the contrary of that obtained with alumina supports.

EXAMPLE 2

Procedure of Example 1 was followed except that $H_2O$ was substituted for DMF in fabrication step.

COMPARATIVE EXAMPLE G

Procedure of Comparative Example E–F followed except that $H_2O$ was substituted for DMF in fabrication step.

Preparation of Catalyst in Totally Aqueos System

Catalysts containing 6% thodium were prepared on two of the carbon supports by a process similar to that described before except that only water was used as a fabrication solvent. In a 500 ml. bottle, 1.72 g $RhCl_3.3H_2O$ was dissolved in 200 ml. $H_2O$ and 10.5 g of catalyst support was added. The mixture was hydrogenated at 50 psig. using a Parr shaker to deposit metal on the carbon support. When $H_2$ uptake was complete, the catalyst was filtered and washed with water. Portions were air dried at room temperature and analyzed by ESCA to determine the intensity ratio of carbon/thodium.

As for the DMF-fabricated catalysts, the C/Rh intensity ratio is considerably larger for the sample prepared on the wide pore carbon support.

We claim:

1. A process providing an improved distribution of active component of a hydrogenation catalyst which comprises selecting a pre-formed porous carbon support having a pore radius of at least about 25 angstrom units, a surface area provided by said pores in the range of about 300 to 700 square meters per gram, and a compacted bulk density in the range of about 0.3 to 0.8 grams per cubic centimeters, reductively depositing upon said support an amount of a platinum metal in the range from about a thousandth to about 15 percent by weight, and obtaining an increased support/intensity ratio by selecting a carbon support having an increased average pore radius.

2. The process of claim 1 wherein the platinum metal is rhodium.

3. The process of claim 1 wherein the platinum metal is deposited from water.

4. The process of claim 1 wherein the platinum metal is deposited from aqueous dimethyl formamide.

5. The process of claim 3 wherein the platinum metal is rhodium.

6. The process of claim 4 wherein the platinum metal is rhodium.

* * * * *

| SUPPORT | SUPPORT PHYSICAL PROPERTIES | | | | |
|---|---|---|---|---|---|
| | RHODIUM CONTENT | SURFACE AREA | PORE VOLUME | PORE RADIUS | C/Rh INTENSITY RATIO BY ESCA |
| EXAMPLE 2 (WIDE PORE CARBON) | 6 | 560 | 0.95 | 34 | 15 |
| COMP. EX. G (NORIT SG EXTRA) | 6 | 850 | 0.70 | 16 | 7.3 |